United States Patent
Stewart et al.

(10) Patent No.: US 10,268,822 B2
(45) Date of Patent: Apr. 23, 2019

(54) FIRMWARE MODULE EXECUTION PRIVILEGE

(71) Applicant: HEWLETT-PACKARD DEVELOPMENT COMPANY, L.P., Houston, TX (US)

(72) Inventors: Christopher H Stewart, Houston, TX (US); Venkatesh Yarraguntla, Houston, TX (US); Dallas M Barlow, Houston, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 148 days.

(21) Appl. No.: 15/516,490

(22) PCT Filed: Dec. 1, 2014

(86) PCT No.: PCT/US2014/067899
§ 371 (c)(1),
(2) Date: Apr. 3, 2017

(87) PCT Pub. No.: WO2016/089348
PCT Pub. Date: Jun. 9, 2016

(65) Prior Publication Data
US 2018/0239900 A1  Aug. 23, 2018

(51) Int. Cl.
G06F 21/57 (2013.01)
G06F 9/4401 (2018.01)
G06F 11/36 (2006.01)
G06F 21/44 (2013.01)

(52) U.S. Cl.
CPC .......... *G06F 21/572* (2013.01); *G06F 9/4401* (2013.01); *G06F 11/3604* (2013.01); *G06F 21/44* (2013.01); *G06F 21/575* (2013.01); *G06F 2221/033* (2013.01)

(58) Field of Classification Search
CPC .................................................... G06F 21/575
See application file for complete search history.

(56) References Cited

U.S. PATENT DOCUMENTS

| | | | |
|---|---|---|---|
| 6,978,018 B2 | 12/2005 | Zimmer et al. | |
| 7,181,610 B2 | 2/2007 | Zimmer et al. | |
| 8,122,244 B2 | 2/2012 | Azema et al. | |
| 8,312,509 B2 | 11/2012 | Zimmer et al. | |
| 2003/0028766 A1 | 2/2003 | Gass et al. | |
| 2005/0021968 A1 | 1/2005 | Zimmer et al. | |
| 2005/0114687 A1 | 5/2005 | Zimmer et al. | |
| 2010/0017659 A1* | 1/2010 | Dos Remedios | G06F 11/2284 714/36 |
| 2011/0087872 A1 | 4/2011 | Gaurav et al. | |

(Continued)

*Primary Examiner* — Albert Wang
(74) *Attorney, Agent, or Firm* — HP Patent Department

(57) ABSTRACT

According to one example for verifying firmware module execution privilege, a firmware is booted on a processor. At least one firmware module in the firmware marked as a test module is identified, and verification with a production public key of metadata associated with the firmware is attempted. In an example, in the event that the metadata verifies successfully with the production public key, the firmware boot is halted when the processor determines that access to a video interface is available, and a user is alerted that a test module has attempted execution in a production firmware.

15 Claims, 3 Drawing Sheets

(56) References Cited

U.S. PATENT DOCUMENTS

| | | |
|---|---|---|
| 2013/0238886 A1 | 9/2013 | Batke et al. |
| 2014/0281504 A1 | 9/2014 | Dasari et al. |
| 2014/0331038 A1 | 11/2014 | Batke et al. |
| 2017/0116427 A1* | 4/2017 | Major ................ G06F 21/6209 |

* cited by examiner

FIRMWARE MODULE EXECUTION PRIVILEGE

BACKGROUND

Electronic devices and computer devices may include a firmware comprising software code to control or operate a device. A firmware may comprise one or more software modules that operate individually or in combination with one another. Firmware developers may create test and production builds of firmware for, e.g., testing and/or release to users.

DETAILED DESCRIPTION

Figure 1:
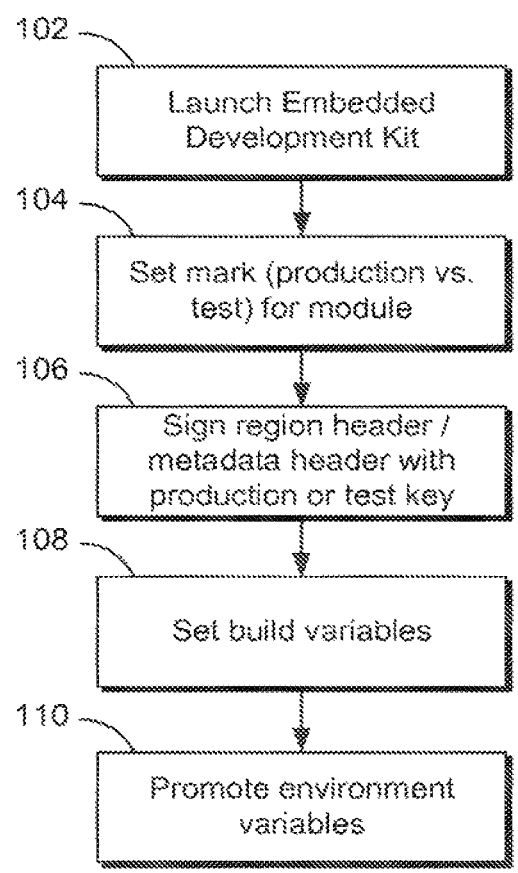
FIG. 1 is a flowchart of building a firmware for release to users, according to an example of the present disclosure.

Electronic devices, computing systems, and components such as desktop computers, laptop computers, servers, tablets, smartphones, printers, scanners, networking equipment, individual components, workstations, thin clients, retail point of sale devices, and other computing equipment (hereinafter "device" or "devices") may include a firmware and/or a firmware interface such as the Basic Input Output System ("BIOS") or the Unified Extensible Firmware Interface ("UEFI") (collectively herein "firmware").

A firmware, in some examples, may be a test firmware for use on a test device. A test firmware may be either a new firmware or a new firmware version that is in development by a firmware developer and has not been marked for release as a production firmware to users. In some examples, a test firmware may include test code or functionality that is not intended to ever be released into a production firmware, such as diagnostic code, code that has not been optimized, or code that has not been quality-controlled.

A firmware may also be a production firmware. In some examples, a production firmware may have been built, tested, and/or passed a quality-control process such that the firmware or firmware update may be released to an end-user, e.g., a customer or other user that is not a firmware developer or device manufacturer.

In some examples, during development, a firmware may be developed as a series of modules with each module comprising certain functionality. For example, one module may be coded to provide for input/output (I/O) control, while another module may be coded to provide for device security. A developer may choose to mark a module as either a test module, during development, or a production module, once that particular module hits been qualified for release to production.

A firmware developer may assemble the various modules into a firmware to be built either as a test firmware or a production firmware. A test firmware, for example, may be provided only to an internal testing team, and may comprise a combination of production and test modules. A production firmware, by contrast, that will be provided to an end user may be intended to comprise only production modules.

Given the complexity of modern electronic and computing devices, a firmware may comprise hundreds or thousands of modules representing hundreds of thousands or millions of lines of code. In an example where each module may be marked as test or production, it is critical that a test module not be inadvertently included in a production firmware. Such a mistake could allow for untested code to execute on an end-user device, which may affect the stability, reliability, compatibility, and efficiency of an end-user device, and in some examples, may increase the size and scope of an attack vector. However, given the size of a firmware package, such a mistake is not uncommon.

In the event that a firmware developer includes a test module into a production firmware, the execution privilege of the test module should be checked at runtime, and the test module should be prevented from loading in a production firmware with a firmware developer or other user alerted as to the module that was prevented from executing based on a privilege. A simple test of a firmware as a production or test firmware at a macro level does not prevent the execution of a module inadvertently included in the firmware that does not have proper execution privilege.

According to one example for verifying firmware module execution privilege, a firmware is booted on a processor. At least one firmware module in the firmware marked as a test module is identified, and a verification with a production public key of metadata associated with the firmware is attempted. In an example, in the event that the metadata verifies successfully with the production public key, the firmware boot is halted when the processor determines that access to a video interface is available, and a user is alerted that a test module has attempted execution in a production firmware.

FIG. 1 is a flowchart of building a firmware for release to users, according to an example of the present disclosure.

In block 102, in an example, an embedded development kit or other software package used for building a firmware is launched. The development kit may be, for example, a development kit for the Unified Extensible Firmware Interface ("UEFI"). In some examples, the development kit is launched, used, and/or maintained by a firmware developer. The development kit may be used either when building and/or releasing a new firmware, or a firmware update.

The firmware may include a module or modules. The modules may be compressed or uncompressed, and may execute either in a pre-Extensible Firmware Interface ("PEI") environment or in a Driver Execution Environment ("DXE"). For example, a signature verification check may execute in PEI, while a richer DXE environment may be used to execute other advanced functionality. The PEI modules and DEI modules may be first bunched as individual binaries, and then bunched together as a single binary.

In block 104, a module or modules in the firmware may be marked as either production or test. In various examples, a single module may be marked, or groups or regions of modules may be marked. In some examples, modules may default to being marked as test unless otherwise marked explicitly as production.

In some examples, as discussed above, modules may be marked as test when they are not fully tested and ready for production. In other examples, modules may be marked as test when they are intended only to execute in a test environment without any intention to ever be released into a production environment. For example, a (test module may allow a firmware developer or device manufacturer to extend certain test functionality within a firmware that is not necessary or appropriate for release to a device end-user.

In some examples, modules may be marked as production once the modules have been built, tested, and/or have passed a quality-control process.

In block 106, the firmware may be signed with a private key. In an example, a firmware designated as a test firmware may be signed with a test private key, e.g., a key designated as being associated only with test firmware builds. In another example, a firmware designated as a production firmware may be signed with a production private key, e.g., a key designated as being associated only with production firmware builds.

The test or production private key may be used to sign either an entire firmware or a region header or metadata header or headers within a firmware. Various cryptographic signature routines may be used.

In block 108, build variables may be set, and in block 110 environment variables may be promoted, such that a firmware comprising modules may be built and released in block 112 (not shown).

Figure 2:
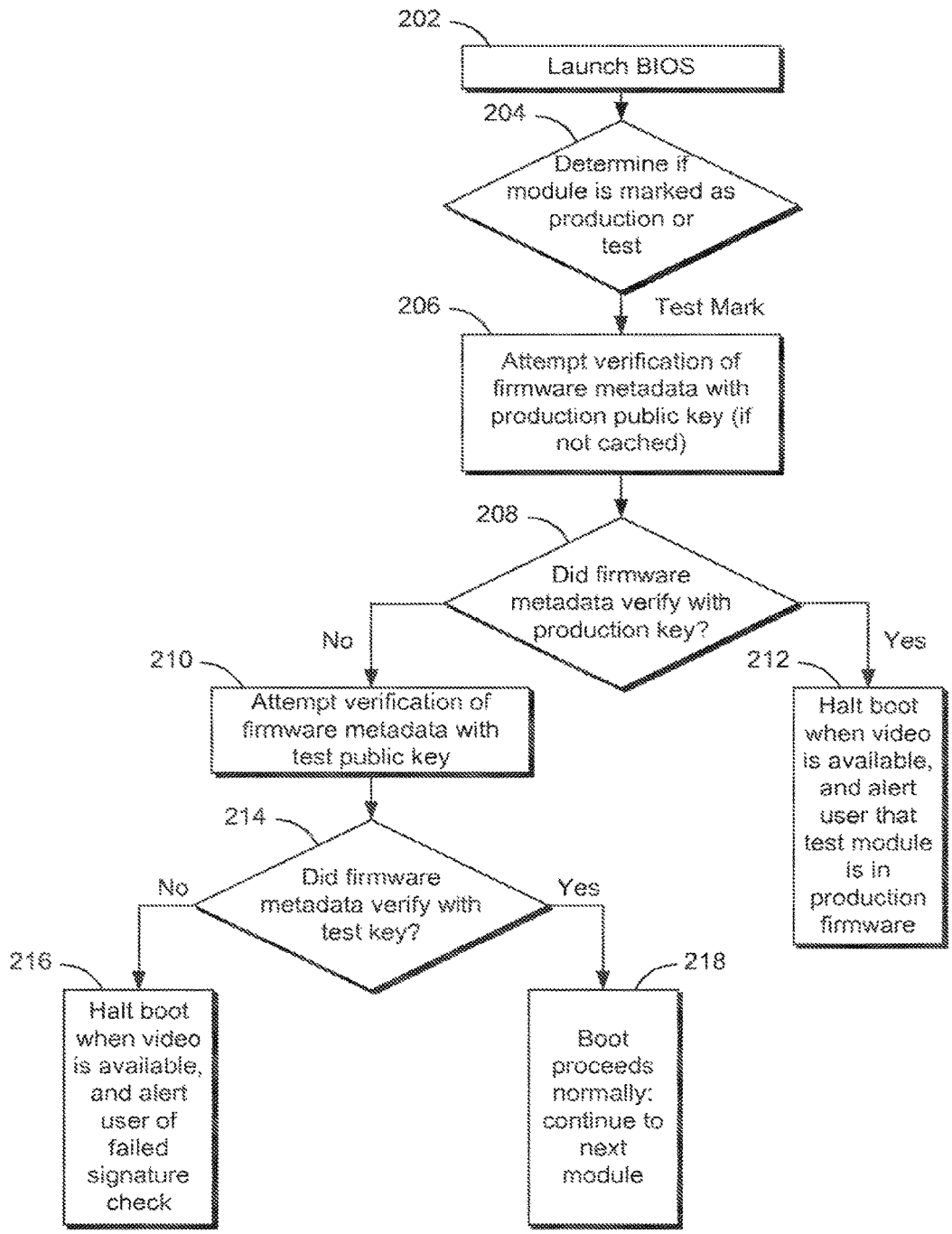
FIG. 2 is a flowchart of verifying firmware module execution privilege, according to an example of the present disclosure.

FIG. 2 is a flowchart of verifying firmware module execution privilege, according to an example of the present disclosure.

In block 202, a firmware and/or firmware interface, e.g., a BIOS or UEFI ("firmware"), is launched. The firmware may be launched on a device such as the devices described above, and may be launched, in some examples, by a firmware developer or team responsible for building, testing, releasing, and/or quality control testing a firmware, or other device software. The launch may be divided into phases, such as launching a PEI phase followed by a DXE phase. In some examples, the steps of FIG. 2 may be first carried out in a test room environment so that a firmware developer can prepare a bug report and remove the test module prior to release, to guarantee that a firmware will fully launch without failed execution privilege checks on an end-user/customer device.

In block 204, a determination may be made for each module in the firmware whether the module is marked as production or test, as described above with respect to block 104.

In block 206, if a module has been determined to be marked as a test module, an attempt may be made to verify firmware metadata associated with the firmware using a production public key. As discussed above with respect to block 106, a test or production private key may have been used to sign a region header or metadata header or headers within the firmware, or in some examples, the entire firmware. In block 206, if even one module in the firmware is marked as test, block 206 will attempt to verify the firmware metadata with a production public key.

In some examples, the production public key may be stored on the device or within the firmware. In some examples, the production public key and/or the metadata that is to be verified may be stored in another location. In some examples, whether or not a firmware has been verified may be cached, such that a subsequent boot of a firmware version does not need to re-verify if the version has already been verified on a particular device. In some examples, different levels of security may be assigned on a module-by-module basis, such that low-security module verification may be cached, while higher-security modules may inquire re-verification upon each boot. In some examples, at least one verification must occur upon every boot.

In block 208, if the firmware metadata verified with a production public key, a test module has been detected within a production firmware. In some examples, the firmware boot may be immediately halted such that a test module not execute in a production firmware. In other examples, as shown in block 212, the launch or boot of the firmware may continue, with execution of the test module suppressed in some examples, until a video resource is available on the device such that a user may be alerted that the firmware boot is being halted, e.g., a POST-time alert. Whether a boot is halted immediately or after a video resource is available may be determined based on a security policy.

In some examples, the video resource may be a video driver, a video interface, or generally a video output. In some examples, the user may be a firmware developer or team responsible for building, testing, releasing, and/or quality control testing a firmware or other device software, while in other examples the user may be an end-user of the device.

In some examples, the alert may be a text or graphical alert which may include a message that a test module has attempted execution in a production firmware, and may include other information useful to, e.g., a firmware developer, such as the test module name or other identifier, a version number, a halt point, or other attributes or data.

In block 208, it the firmware metadata did not verify successfully with the production key, flow may continue to block 210 where an attempt may be made to verify firmware metadata associated with the firmware using a test public key.

In block 214, if the firmware metadata verified successfully with the test key, the boot of the firmware may continue normally, e.g., the next module to be loaded may be loaded, or if all modules have been loaded, the firmware boot may complete.

In block 216, if the firmware metadata did not verify successfully with the test key, the boot may be halted when video is available, and as discussed above, an alert may be displayed to a user with a message that a signature check failed.

In some examples, the flow of FIG. 2 may be extended to verify modules marked as production by, e.g., verifying the firmware metadata with a production public key.

Figure 3:
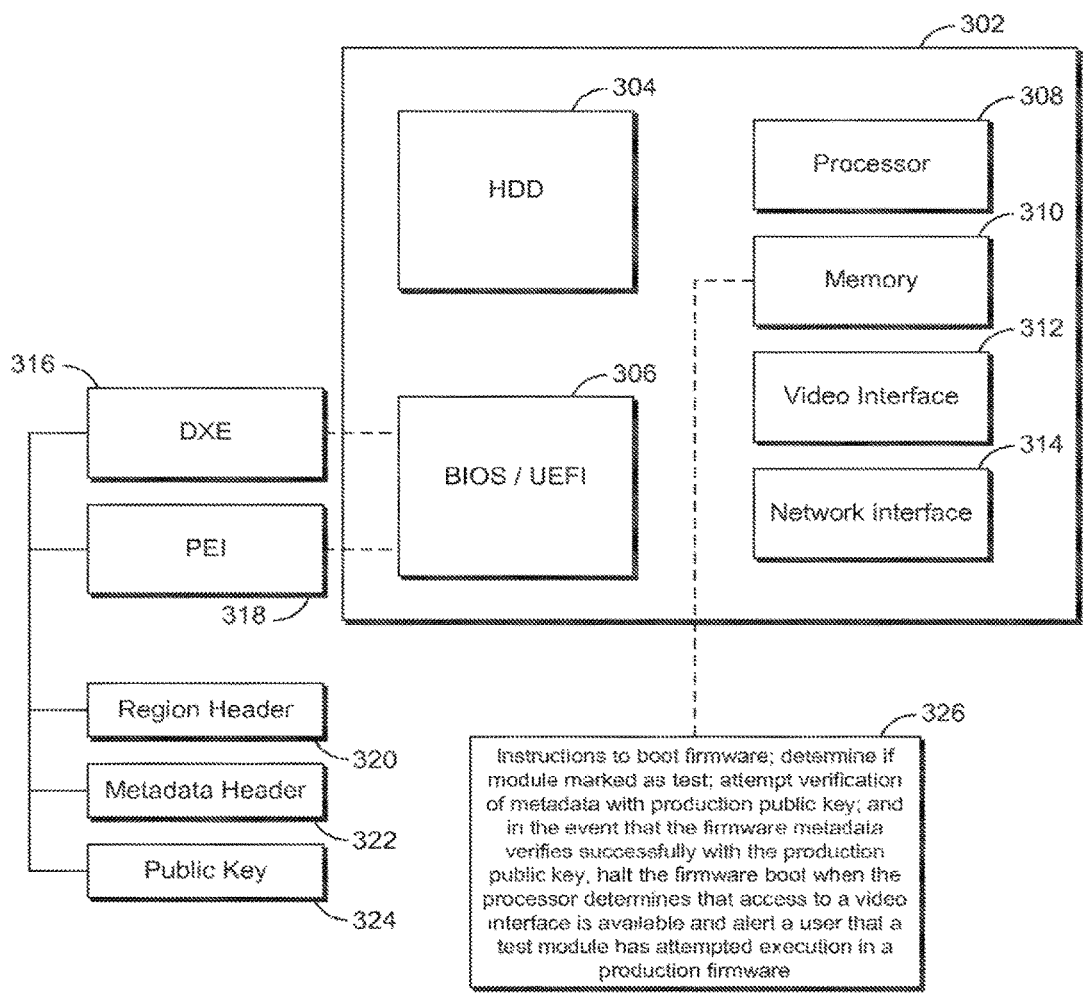
FIG. 3 is a diagram of a device for verifying firmware module execution privilege, according to an example of the present disclosure.

FIG. 3 is a diagram of a device for verifying firmware module execution privilege, according to an example of the present disclosure.

Device 302 may comprise a disk drive 304 such as a hard disk drive, a solid state disk drive, or other storage mechanism or media. Device 302 may also include a firmware and/or firmware interface 306 such as a BIOS or UEFI. Firmware 306 may comprise a PEI and/or DXE, each of which may include region headers 320, metadata headers 322, and/or a production or test public key 324. Firmware 306 may be stored on, for example, a Serial Peripheral Interface ("SPI") Flash.

In some examples, a production firmware may not include a test public key, to prevent accidental verification of a test module, particularly in cases where a security requirement or policy is in place. In contrast, a test firmware may include both a test public key and a production public key, to allow a firmware developer to test a firmware comprising both test and production modules.

Device 302 may also comprise a processor 308, a memory 310, a video interface 312, and a network interface 314, all of which may be coupled by a bus or other interconnect. In some examples, device 302 may also comprise a computer readable medium, which may comprise an operating system, network applications, and/or an execution privilege verification function.

Some or all of the operations set forth in the figures may be contained as a utility, program, or subprogram in any desired computer readable storage medium, or embedded on hardware. In addition, the operations may be embodied by machine-readable instructions. For example, they may exist as machine-readable instructions in source code, object code, executable code, or other formats. The computer readable medium may also store other machine readable instructions, including instructions downloaded from a network or the internet.

In an example where the device of FIG. 3 is a device for verifying firmware module execution privilege, memory 310 may store instructions 326 to boot firmware 306; determine if a module in firmware 306 is marked as a test module; attempt verification of metadata, e.g., in region header 320 or metadata header 322 with a production public key 324; and in the event that the firmware metadata verifies successfully with the production public key 324, halt the firmware boot when the processor 308 determines that access to a video interface 312 is available and alert a user that a test module has attempted execution in a production firmware, as discussed in more detail with respect to FIG. 2. The instructions may be executed by, e.g., processor 302.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method of verifying firmware module execution privilege, comprising:
    booting a firmware on a processor;
    identifying at least one firmware module in the firmware marked as a test module;
    attempting verification with a production public key of metadata associated with the firmware; and
    in the event that the metadata verifies successfully with the production public key, halting the firmware boot when the processor determines that access to a video interface is available, and alerting a user that a test module has attempted execution in a production firmware, and
    in the event that the metadata does not verify successfully with the production public key, attempting verification of the metadata with a test public key.

2. The method according to claim 1, further comprising continuing the booting of the firmware on a processor in the event that verification of the metadata with a test public key succeeds.

3. The method according to claim 1, further comprising halting the firmware boot when the processor determines that access to a video interface is available and alerting a user that a test module failed verification in the event that verification of the metadata with a test public key fails.

4. The method according to claim 1, further comprising storing a flag in a memory associated with the firmware in the event that the metadata verifies successfully with the test public key.

5. The method according to claim 1, wherein the metadata is stored in a driver execution environment.

6. The method according to claim 1, wherein the metadata is stored in a pre-extensible firmware interface environment.

7. A system for verifying firmware module execution privilege, comprising:
    a processor;
    a firmware comprising at least one module, at least one header, and at least one public key associated with a production firmware; and
    a video interface,
    wherein the processor is to boot the firmware and determine whether at least one firmware module in the firmware is marked as a test module and attempt verification of the firmware with a production public key, and in the event that the metadata does not verify successfully with the production public key, the processor is to attempt verification of the firmware with a test public key,
    and wherein the processor is to halt the firmware boot when the video interface is available in the event that the firmware does not verify with the test public key.

8. The system according to claim 7, wherein the processor is to output to the video interface an alert that at least one firmware module in the firmware did not validate with a test public key.

9. The system according to claim 7, wherein the firmware comprises a Driver Execution Environment phase.

10. The system according to claim 7, wherein the firmware comprises a pre-EFI initialization phase.

11. The system according to claim 7, wherein the firmware comprises a Unified Extensible Firmware Interface.

12. A non-transitory computer readable storage medium on which is embedded a computer program, said computer program to verify a firmware module execution privilege, said computer program comprising a set of instructions to:
    launch a firmware including a region header and a video interface;
    identify at least one firmware module in the firmware marked as a test module;
    attempt verification of an element in the region header with a production key; and
    in the event that the region header verifies successfully with the production key, output to the video interface an alert that a firmware module does not have a production execution privilege.

13. The computer readable storage medium according to claim 12, wherein the alert is a run-time alert.

14. The computer readable storage medium according to claim 12, wherein the output identifies a module name and a module privilege level.

15. The computer readable storage medium according to claim 12, wherein the result of the verification is cached.

* * * * *